(12) United States Patent
Loher

(10) Patent No.: US 9,258,348 B2
(45) Date of Patent: *Feb. 9, 2016

(54) APPLYING A VARIABLE ENCODING/DECODING SCHEME IN A COMMUNICATION NETWORK

(75) Inventor: Darren P. Loher, Arvada, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/632,731

(22) Filed: Dec. 7, 2009

(65) Prior Publication Data

US 2010/0208601 A1    Aug. 19, 2010

Related U.S. Application Data

(63) Continuation of application No. 11/027,561, filed on Dec. 29, 2004, now Pat. No. 7,630,308.

(60) Provisional application No. 60/567,540, filed on May 3, 2004.

(51) Int. Cl.

| | |
|---|---|
| *H04L 1/00* | (2006.01) |
| *H04L 29/06* | (2006.01) |
| *H04L 29/08* | (2006.01) |
| *H04L 12/18* | (2006.01) |
| *H04B 14/00* | (2006.01) |
| *G10L 19/22* | (2013.01) |

(52) U.S. Cl.
CPC ............... *H04L 65/607* (2013.01); *H04L 65/80* (2013.01); *G10L 19/22* (2013.01); *H04B 14/00* (2013.01); *H04L 12/1813* (2013.01); *H04L 67/00* (2013.01)

(58) Field of Classification Search
CPC .......................... H04L 12/1813; H04L 67/00
USPC ............................ 370/468, 252, 230.1, 267
See application file for complete search history.

(56) References Cited

U.S. PATENT DOCUMENTS

| | | | |
|---|---|---|---|
| 4,782,485 A | 11/1988 | Gollub | |
| 6,108,560 A * | 8/2000 | Navaro | H04L 5/1438 370/468 |
| 6,122,665 A | 9/2000 | Bar et al. | |
| 6,356,545 B1 * | 3/2002 | Vargo et al. | 370/355 |
| 6,373,839 B1 | 4/2002 | Clark et al. | |
| 6,512,924 B2 | 1/2003 | Sawada et al. | |
| 6,597,702 B1 * | 7/2003 | Caugherty | 370/410 |
| 6,600,738 B1 | 7/2003 | Alperovich et al. | |
| 6,633,582 B1 | 10/2003 | Panburana et al. | |
| 6,731,734 B1 | 5/2004 | Shaffer et al. | |
| 6,754,221 B1 | 6/2004 | Whitcher et al. | |
| 6,785,263 B1 | 8/2004 | Morinaga et al. | |
| 6,798,786 B1 * | 9/2004 | Lo et al. | 370/468 |
| 6,826,174 B1 | 11/2004 | Erekson et al. | |
| 6,977,911 B1 * | 12/2005 | Geen et al. | 370/328 |

(Continued)

*Primary Examiner* — Ricky Ngo
*Assistant Examiner* — Dewanda Samuel

(57) ABSTRACT

Various systems, devices and methods for providing variable encoder/decoder mechanisms are disclosed. As one example, a coder/decoder device including a plurality of coder/decoder mechanisms, a coder/decoder selection engine, and a computer readable medium is disclosed. The computer readable medium includes a network statistic. The coder/decoder selection engine is operable to select at least one of the plurality of coder/decoder mechanisms based at least in part on the network statistic. Further, the coder/decoder selection engine is operable to offer the at least one of the plurality of coder/decoder mechanisms.

8 Claims, 11 Drawing Sheets

(56) References Cited

U.S. PATENT DOCUMENTS

| | | | |
|---|---|---|---|
| 7,002,992 B1* | 2/2006 | Shaffer et al. | 370/468 |
| 7,023,839 B1* | 4/2006 | Shaffer et al. | 370/356 |
| 7,111,049 B1* | 9/2006 | Granger et al. | 709/216 |
| 7,167,451 B1* | 1/2007 | Oran | 370/252 |
| 7,184,400 B2 | 2/2007 | Andonov et al. | |
| 7,254,120 B2* | 8/2007 | LeBlanc | 370/335 |
| 7,257,130 B2* | 8/2007 | Sirbu | 370/465 |
| 7,260,060 B1 | 8/2007 | Abaye et al. | |
| 7,394,807 B2* | 7/2008 | Hamiti et al. | 370/328 |
| 7,453,908 B2* | 11/2008 | Yu et al. | 370/477 |
| 7,509,425 B1* | 3/2009 | Rosenberg | 709/227 |
| 7,512,118 B1* | 3/2009 | Stephens | H04L 65/1069 370/352 |
| 7,620,052 B2* | 11/2009 | Witzel et al. | 370/395.21 |
| 7,630,308 B1 | 12/2009 | Loher | |
| 7,787,447 B1* | 8/2010 | Egan et al. | 370/389 |
| 7,821,953 B2* | 10/2010 | Yarlagadda et al. | 370/252 |
| 7,907,523 B2* | 3/2011 | Koo et al. | 370/230 |
| 7,986,634 B2* | 7/2011 | Kang et al. | 370/252 |
| 2003/0048855 A1* | 3/2003 | Klaghofer et al. | 375/259 |
| 2003/0219006 A1* | 11/2003 | Har | H04L 29/06027 370/352 |
| 2004/0160963 A1* | 8/2004 | Dong et al. | 370/395.21 |
| 2005/0008030 A1* | 1/2005 | Hoffmann et al. | 370/466 |
| 2005/0091392 A1* | 4/2005 | Gesswein et al. | 709/231 |
| 2005/0201414 A1 | 9/2005 | Awais | |
| 2006/0174015 A1* | 8/2006 | Arauz-Rosado | 709/228 |

* cited by examiner

APPLYING A VARIABLE ENCODING/DECODING SCHEME IN A COMMUNICATION NETWORK

CROSS REFERENCE TO RELATED APPLICATIONS

This application is a continuation of U.S. patent application Ser. No. 11/027,561 filed Dec. 29, 2004 now U.S. Pat. No. 7,630,308 ("Systems and Methods for Applying a Variable Encoding/Decoding Scheme in a Communication Network), which claims priority to and the benefit of U.S. Provisional Patent Application No. 60/567,540, entitled "Network Compensating Codec and Methods for Using Such" and filed on May 3, 2004, the contents of which are incorporated herein by reference.

BACKGROUND OF THE INVENTION

The present invention is related to systems and methods for facilitating communications via a communication network. More particularly, the present invention is related to systems and methods for operating endpoints in a communication network.

In a typical system 100 depicted in FIG. 1, two endpoints 110, 120 in a communication network 130 communicate information to one another. This information may be compressed or otherwise encoded. As such, one or more encoder/decoders are utilized by endpoints 110, 120 to facilitate the communication. In some cases the encoder/decoders adapt to the information stream being sent/received in an effort to assure transmission success. However, it may be the case that network congestion or other failures cause information loss or even complete failure in the communication.

Hence, for at least the aforementioned reasons, there exists a need in the art for advanced systems and methods for performing communications in a communication network.

BRIEF SUMMARY OF THE INVENTION

The present invention is related to systems and methods for facilitating communications via a communication network. More particularly, the present invention is related to systems and methods for operating endpoints in a communication network.

Some embodiments of the present invention provide methods for selecting a network coder/decoder mechanism. The methods include providing a plurality of coder/decoder mechanisms. In addition, network functionality is analyzed. Based at least in part on the analyzed network functionality, at least one of the plurality of coder/decoder mechanisms is offered to support a network communication, and an acceptance of the offer is received. In some instances of the methods, the acceptance of the offer includes initiating communication between endpoints consistent with an accepted coder/decoder mechanism.

In some cases of the methods, the offer is provided by a first endpoint to a second endpoint, and the acceptance is provided from the second endpoint to the first endpoint. In such cases, the network analysis can be done from the perspective of the first endpoint. In various cases of the methods, the network analysis can include performing one or more protocols including, but not limited to, a ping, a trace route, RTCP, and RTCP XR.

In some instances of the methods, a set of coder/decoder mechanisms are offered. In such instances, the acceptance includes an indication of one of the coder/decoder mechanisms from the set of coder/decoder mechanisms. In various cases, the set of coder/decoder mechanisms are provided as an ordered list. The order can be, for example, indicative of the preferred order of coder/decoder mechanisms as determined from the perspective of the offering end point. In particular cases, the perspective of the offering end point is based on an analysis of network functionality from the perspective of the offering end point. Based on the disclosure provided herein, one of ordinary skill in the art will recognize a number of orders that can be applied to the set of coder/decoder mechanisms.

In various instances of the methods, the offer of coder/decoder mechanisms is provided by a first endpoint and the analysis of network functionality is done from the perspective of the first endpoint. In such instances, acceptance of the offer is provided by a second endpoint. In one particular case, the acceptance may be based on an analysis of network functionality done from the perspective of the second endpoint. In some cases, the set of coder/decoder mechanisms includes a characteristic definition that includes one or more of the following elements: a bandwidth information, a packet loss information, a jitter threshold information, and a latency threshold information.

Other embodiments of the present invention provide coder/decoder systems. The systems include an instruction execution unit and a computer readable medium. The computer readable medium includes a network statistic and instructions executable by the instruction execution unit to: implement a plurality of coder/decoder mechanisms; offer at least one of the plurality of coder/decoder mechanisms based at least in part on the network statistic; and receive an acceptance of the offer. In some cases, the instructions executable by the instruction execution unit are further executable to: analyze a network; and update the network statistic based at least in part on the network analysis. In other cases, the instructions executable by the instruction execution unit are further executable to receive the network statistic.

Yet other embodiments of the present invention provide coder/decoder devices. These coder/decoder devices include a plurality of coder/decoder mechanisms, a coder/decoder selection engine, and a computer readable medium. The computer readable medium includes a network statistic. The coder/decoder selection engine is operable to select at least one of the plurality of coder/decoder mechanisms based at least in part on the network statistic. Further, the coder/decoder selection engine is operable to offer the at least one of the plurality of coder/decoder mechanisms. In some cases, the coder/decoder devices further include a network analysis engine that is operable to analyze a network and to provide the network statistic.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for facilitating communications via a communication network. More particularly, the present invention is related to systems and methods for operating endpoints in a communication network.

Figure 1:
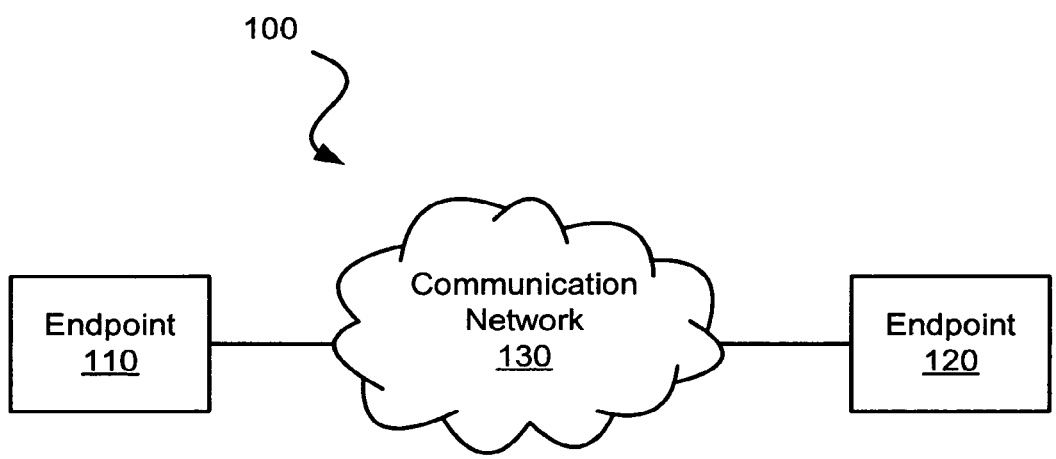
FIG. 1 depicts a typical system providing for communication between endpoints.
Figure 2:
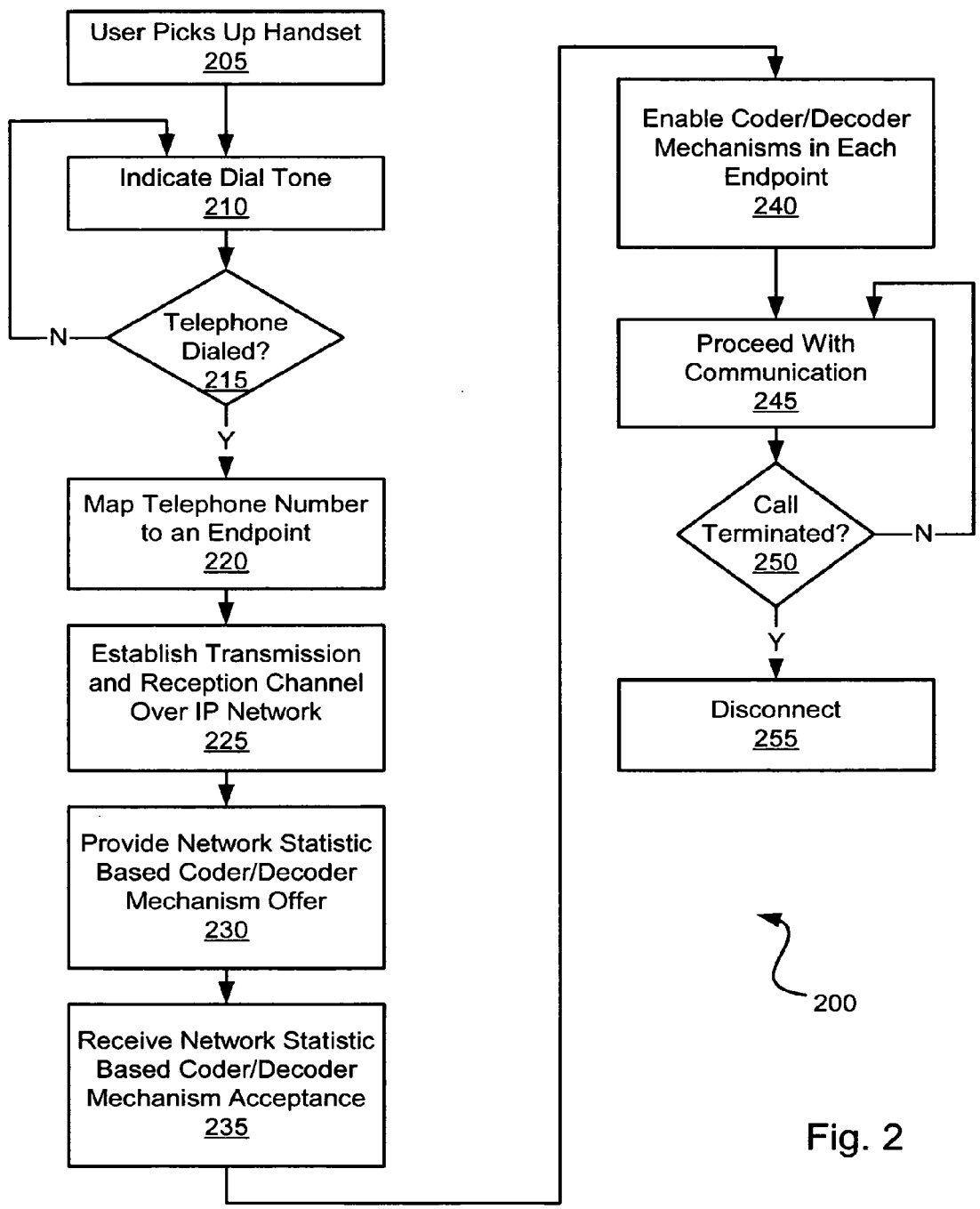
FIG. 2 is a flow diagram providing a high level view of a method for communication in accordance with some embodiments of the present invention.

Various embodiments of the present invention provide for communications including variance in coder/decoder mechanism selection. As used herein, the term "coder/decoder mechanism" is used in its broadest sense to mean any mechanism and/or algorithm for encoding, decoding and/or compressing information. Such may include, but is not limited to, hardwired devices, software based devices, systems and/or combinations thereof. In some cases, the selection of one or more coder/decoder mechanisms is made based at least in part on communication network statistics. In one particular embodiment, the selection is performed in relation to a Voice over Internet Protocol ("VoIP") call. A high level discussion of such a VoIP call including selection of a coder/decoder mechanism in accordance with one or more embodiments of the present invention is described in relation to a flow diagram 200 of FIG. 2.

Following flow diagram 200, a user picks up a handset (block 205). Removing the handset signals an off-hook condition to router associated with the handset. A dial tone is indicated to the user via the handset (block 210), and the entry of a destination phone number is awaited (block 215). Once the destination phone number is received (block 215), the destination phone number is mapped to an IP host (block 220). In some cases, an h.323 or SIP signalling protocol is involved in communicating the destination phone number, and indication of what the IP address endpoints are in addition to setting up the transmit and receive channels (e.g., media flows). At this point, the router has a direct connection to either the endpoint represented by the destination telephone number. A transmission and reception channel are then established across the VoIP network (block 225). This can be done by, for example, running an H.323 session protocol. Where the call involves a signalling gateway, the signalling gateway may forward the call to the endpoint associated with the destination phone number. With the communication channels established, a network statistic based coder/decoder mechanism offer is provided from one endpoint to the other (block 230). This offer indicates one or more coder/decoder mechanisms acceptable and/or desirable to the offering endpoint. Various coder/decoder mechanisms included in the offer may be selected based on one or more network performance characteristics (i.e., network statistics) available to the offering endpoint. In some cases, these network statistics are derived from the perspective of the offering endpoint. These network statistics are described in greater detail below, and based on the disclosure provided herein, one of ordinary skill in the art will recognize a variety of network statistics that can be used in accordance with embodiments of the present invention for selecting and/or preferencing coder/decoder mechanisms in the offer.

Various embodiments of the present invention may utilize a variety of different coder/decoder mechanisms to support communications. For example, Pulse Code Modulation ("PCM") and adaptive differential PCM ("ADPCM") may be utilized. These are two examples of waveform techniques that exploit the redundant characteristics of the waveform itself to increase signal integrity. Implementations of PCM are defined by the International Telecommunications Union ("ITU") and include, but are not limited to, G.711 which is a 64-kbps PCM voice coding technique, G.729 which is a CELP compression scheme where voice is coded into 8-kbps streams and provides speech quality similar to 3 kbps ADPCM, and G.729 Annex A which is similar to the aforementioned G.729 approach but differs in computational complexity. Again, based on the disclosure provided herein, one of ordinary skill in the art will recognize a myriad of coder/decoder mechanisms that can be used in accordance with embodiments of the present invention.

Each coder/decoder mechanism provides a certain performance for transmission of non-video information including, but not limited to voice, data, music, or the like. Thus, selection of a coder/decoder mechanism is often impacted by the amount of network bandwidth, network characteristics such as network delay and lossiness, and the quality of speech either desired or accepted. Based on the disclosure provided herein, one of ordinary skill in the art will recognize a number of tradeoffs that can be made in selecting a coder/decoder mechanism for use in relation to communications. Further, based on the disclosure provided herein, one of ordinary skill in the art will recognize various relationships between network statistics and the tradeoffs involved in selecting or preferencing between coder/decoder mechanisms.

Additionally, each coder/decoder mechanism introduces a handling delay in the communication path. This delay, in addition to network delay can greatly impact the perceived quality of voice communications. For example, if the combined delay becomes too large, the voice communication may become unrecognizable. Even where the voice communication is still recognizable, the quality may diminish to the point that it is irritating to the communicating users. Thus, in selecting an appropriate coder/decoder mechanism, appropriate consideration of network delay (i.e., a network statistic commonly referred to as "end-to-end delay") in relation to a coder/decoder mechanism handling delay may be warranted.

Further, some coder/decoder mechanisms may include buffering capable of jitter compensation. This jitter compensation buffering can affect overall communication delay, and may be considered in providing any offer and/or acceptance of coder/decoder mechanisms. As will be appreciated by one of ordinary skill in the art, jitter occurs when there is a difference between when a voice packet is received, and when it is expected. Coder/decoder mechanisms may also include echo control functionality. One of ordinary skill in the art will recognize that a total end to end delay can be involved in a transmission. Where the endpoints are involved in a voice call, the end-to-end delay is the delay from person-to-person involved in the call. As used herein, this end-to-end delay refers to the sum of network delay, coder/decoder algorithm delay, jitter buffer delay, queuing delays, and any other handling delays.

In response to the offer (block 230), the endpoint receiving the coder/decoder mechanism offer selects one of the offered coder/decoder mechanisms (block 235). This selection is returned to the offering endpoint as an acceptance. In some cases the acceptance is provided via a message indicating the selected coder/decoder mechanism. In other cases, the acceptance is implicit as the accepting endpoint simply begins to communicate with the offering endpoint using a protocol consistent with the selected coder/decoder mechanism. Further, in some cases, selecting the accepted coder/decoder mechanism is done based at least in part on network statistics available to the accepting endpoint. These network statistics may indicate network performance from the perspective of the accepting endpoint. Again, these network statistics are described in greater detail below, and based on the disclosure provided herein, one of ordinary skill in the art will recognize a variety of network statistics that can be used in accordance with embodiments of the present invention for selecting the coder/decoder mechanism indicated by the acceptance.

With the offer and acceptance complete (blocks 230, 235), the selected coder/decoder mechanism is enabled in each endpoint (block 240). The communication now proceeds using the selected coder/decoder mechanism (block 245) until the call is terminated (block 250). It should be noted that in some embodiments including one more fully described below, that the coder/decoder mechanism can be changed during a call. Call termination can be indicated by, for example, replacing the handset. Once the call is terminated (block 250), the established communication path(s) is/are disconnected (block 255).

Currently VoIP media sessions transiting a congested network link suffer packet loss leading to degraded quality. When congestion becomes large enough and quality becomes bad enough, media sessions will stop. This stoppage is due to failure of coder/decoder mechanisms, loss of signaling state, and termination of calls by users. In heavy congestion scenarios, additional communication sessions are also constantly being set up and attempting to transit the congested network. This creates "pent-up" demand on a macro scale. On a micro scale for individual communication sessions, an individual may experience bandwidth limits due to fixed constraints such as access line speed. These factors can perpetuate additional congestion across a network segment. In accordance with embodiments of the present invention, coder/decoder mechanisms can adapt to a network conditions affecting an ongoing communication session. The ability for communication sessions to be able to detect and respond to network conditions may provide dramatic improvement of quality and reduction of network congestion in various scenarios. This adjustment in performance can result in significant enhancement of quality under less than ideal network states. Thus, various embodiments of the present invention provide variable coder/decoder systems and methods that can adapt to network state. In some cases, end user voice agents can dynamically detect network conditions and respond by selecting a coder/decoder mechanism appropriate for the current network state. Selection may be, for example, based on an algorithm weighting user preference versus network conditions and thresholds. For each available coder/decoder mechanism, a bandwidth, packet loss, jitter and/or latency threshold may be defined. These thresholds can be used in relation to the selection process. An end user voice agent can be, but is not limited to, a device and/or collection of software that transmits voice media or data over IP packets.

Figure 3:
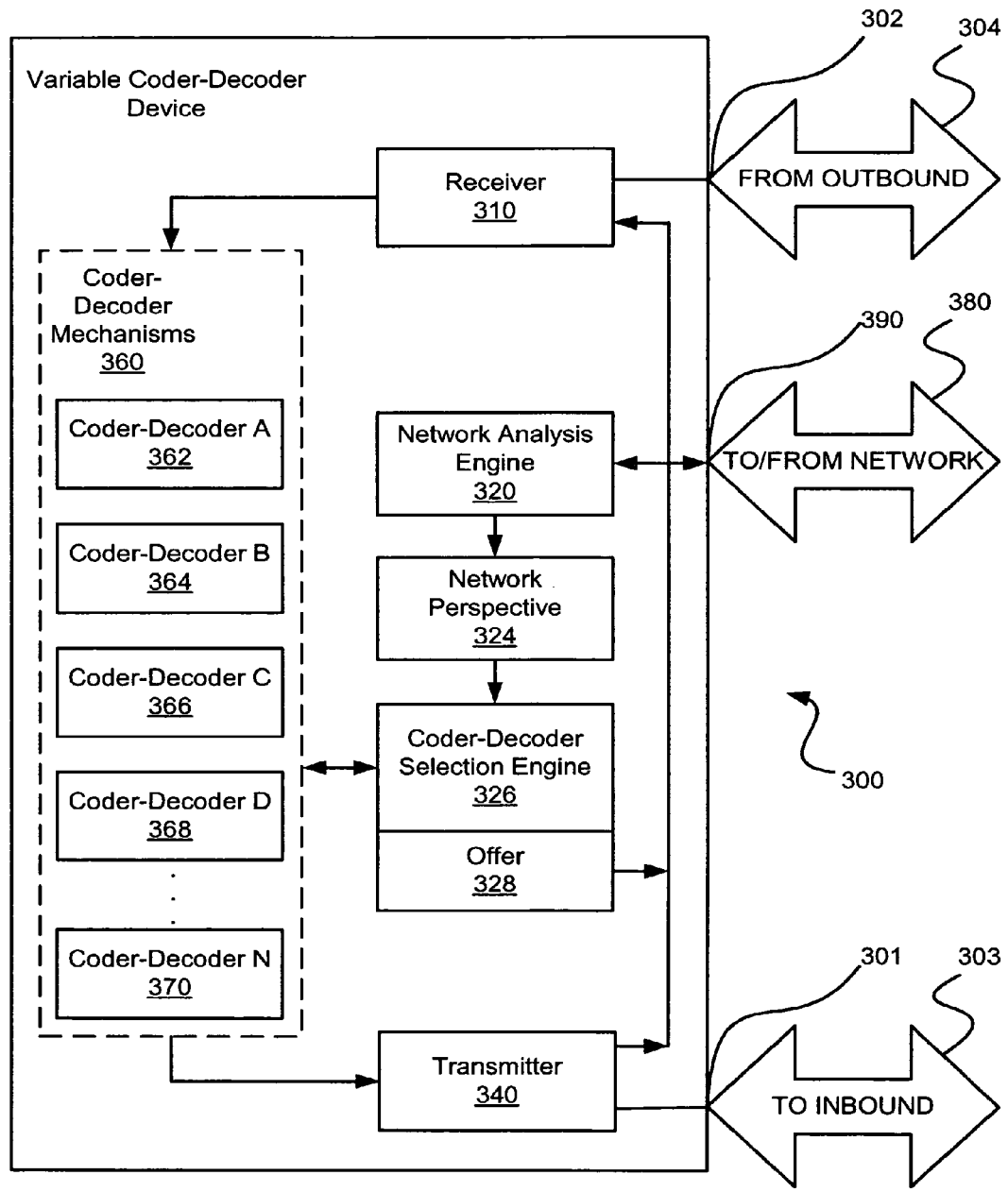
FIG. 3 depicts a variable coder/decoder device in accordance with one or more embodiments of the present invention.

Turning now to FIG. 3, a variable coder/decoder device 300 in accordance with one or more embodiments of the present invention is illustrated. Device 300 includes a set of coder/decoder mechanisms 360 individually enumerated as coder/decoder mechanisms 362, 364, 366, 368, 370. Each of coder/decoder mechanisms implements a different coding/decoding algorithm or scheme. In one particular embodiment of the present invention, coder/decoder mechanism group 360 is implemented as a Digital Signal Processor ("DSP") and a computer readable medium including instructions executable by the DSP to implement the various coder/decoder mechanisms. In another embodiment of the present invention, coder/decoder mechanisms 362, 364, 366, 368, 370 are hardwired in device 300. Based on the disclosure provided herein, one of ordinary skill in the art will recognize a variety of implementations for coder/decoder mechanism group 360. Based on the disclosure provided herein, one of ordinary skill in the art will recognize that coder/decoder mechanisms can be implemented in a variety of ways including, but not limited to, via software in either a microprocessor or a DSP, in firmware via a microprocessor or DSP, via a programmable logic device or array, via an application specific integrated circuit, or other equipment.

Device 300 also includes an interface 390 for coupling device 300 to a communication network 380. A receiver 310 is capable of receiving communication information from communication network 380 via interface 390, and from an outbound communication device 304 via interface 302. In one particular embodiment, interfaces 304, 390 are composed of groups of wires forming communication busses, while in other cases, interfaces 304, 390 are respectively single wire or optical input/output capable of transmitting information to/from device 300. A network analysis engine 320 is operable to send and receive communications to/from network 380 via interface 390. Based on communications passed to/from network 380, network analysis engine 320 develops network characteristics (i.e., network statistics) and provides the developed characteristics to a network perspective 324. Network perspective 324 is typically a computer readable medium, and more particularly a register set capable of maintaining network statistics such as, for example, network congestion and delay statistics.

Network analysis engine 324 may implement one or more procedures for developing network statistics. For example, network analysis engine 324 may receive measurements derived from an expected receive pattern. The expected receive pattern may, for example, be the twenty millisecond spacing inherent in communications received from a coder/decoder mechanism implementing a G.711 scheme. The addition of Real Time Communication Protocol ("RTCP") to the receive pattern allows for determining network latency from the perspective of device 300. In particular, RTCP allows device 300 to determine latency between device 300 and the end point with which it is communicating. Alternatively, or in addition, an endpoint may send a message to another known endpoint, and the other endpoint may return a "send" network analysis to device 300. This information can be used to update network perspective 324. In some cases, device 300 communicates frequently with a particular endpoint. In such a case, historical information about prior communications with the frequented endpoint can be used to update network statistics maintained by network perspective 324.

Device 300 also includes a coder/decoder selection engine 326. Coder/decoder selection engine 326 is operable to select between coder/decoder mechanisms included in coder/decoder mechanism group 360. This selection is formatted as an offer 328 that can be passed to another endpoint via communication network 380. The offer can indicate one or more coder/decoder mechanisms from coder/decoder mechanism group 360. In some cases, the offer includes an indication of multiple coder/decoder mechanisms in a preferential order. The order may indicate which coder/decoder mechanisms are more highly preferred based at least in part on network statistics maintained by network perspective 324.

Coder/decoder selection engine 326 may use statistical information from network perspective 324. These statistics may be real time or historical statistics. Thus, for example, a communication may be ongoing, and at a mid-communication point, one of the endpoints involved in the communication may provide a new coder/decoder mechanism offer based on observed receive thresholds developed through monitoring the ongoing communication.

Alternatively or in addition, an endpoint may communicate frequently with another particular endpoint, such as, for example a fixed media gateway, session border controller, or network address translation (NAT) gateway. In such a case, historical information developed in relation to past communications with the endpoint can be used to select coder/decoder mechanisms for inclusion in the offer. This may not provide a very satisfying universal selection approach, but may be very useful where an endpoint is communicating in a NAT traversal environment, or other environment, such as an environment where a network element common to all of the end point's network interfaces is the performance limiting factor (e.g., an end point's local network connection). In such a case, the remote endpoint with which communication is ongoing may not change frequently.

As yet another alternative, where a remote performance report is available to network analysis engine 320, one or more coder/decoder mechanisms may be selected based on the report. Such a report may be enabled by an active media test session including RTCP and/or via a remote endpoint reporting mechanism such as that discussed above, or some test endpoint capable of reporting network status to network analysis engine 324. Based on the disclosure provided herein, one of ordinary skill in the art will recognize other approaches to selection implemented by coder/decoder selection engine 326.

In addition, device 300 includes a transmitter 340 for transmitting communication information to communication network 380 via interface 390, and for transmitting information to an inbound communication device 303 via an interface 301. In some cases, transmitter 340 is also used to transmit offer and acceptance information to communication network 380. In one particular case, inbound communication device 303 is a speaker associated with a handset, while in other cases it is a communication input on another device. Similarly, in some cases, outbound communication device 304 is a microphone on a handset, while in other cases it is a communication output on another device. In some cases, outbound communication device and inbound communication device are analog devices, and receiver 310 and transmitter 340 respectively include analog to digital and digital to analog converters. Based on the disclosure provided herein, one of ordinary skill in the art will recognize a variety of inbound and outbound communication devices to which device 300 may be coupled, and a variety of implementation specifics for device 300 depending upon what outbound and inbound communication devices to which device 300 will be coupled.

In operation, communication information is received from communication network 380. In turn, receiver 310 passes the communication information to coder/decoder mechanism group 360 where the selected coder/decoder mechanism decodes the communication information and passes it to transmitter 340. Transmitter 340 passes the decoded communication information to an inbound communication interface 301. In one particular scenario, inbound communication interface 301 is coupled to a speaker on a handset allowing the communication information to be heard by a recipient.

In addition, raw communication information is received by receiver 310 via an outbound communication interface 302. This communication information may be received via a microphone of a handset and allows voice information from a user to be provided to device 300. Receiver 310 passes the communication information to coder/decoder mechanism group 360 where the selected coder/decoder mechanism decodes the communication information and passes it to transmitter 340. In turn, transmitter 340 passes the encoded communication information to communication network 380.

Turning now to FIG. 4, flow diagrams 401, 403, 405, 407 illustrate various methods for utilizing variable coder/decoders in accordance with some embodiments of the present invention. Following flow diagram 401, a request to communicate is received (block 402). The request may be, but is not limited to, a request to initiate a VoIP call from one endpoint to another. Upon receiving the network access request (block 402), a coder/decoder system/device that will be used to initiate the request accesses network statistics to determine what coder/decoder mechanisms to offer in relation to the request (block 404). Based at least in part on the network statistics one or more coder/decoder mechanisms are selected (block 406). Where no network statistics are available, a default set of coder/decoder mechanisms may be chosen. The one or more coder/decoder mechanisms are then assembled into a set of preferred coder/decoder mechanisms (block 408). Thus, for example, in some cases where more than one coder/decoder mechanism is selected, the selected coder/decoder mechanisms are placed in a preferential order of selection.

The one or more coder/decoder mechanisms are then indicated in an offer to an endpoint that is the intended recipient of the initiated communication (block 410). A communication is then returned from the recipient endpoint (block 412). The returned communication conforms to one of the coder/decoder mechanisms represented in the offer, thus implicitly indicating an acceptance by the recipient endpoint of the offer. It is determined whether the communication actually conforms with a coder/decoder mechanism from the offer (block 414). Where the returned communication does not conform (block 414), an action appropriate for the signalling protocol used is performed. This may include terminating the communication, or repeating the offering process (blocks 410, 412).

Alternatively, where the returned communication conforms (block 414), the coder/decoder mechanism implicitly accepted via the return communication is selected for decoding/encoding/compressing message sent in relation to the ongoing communication (block 416). With the particular coder/decoder mechanism selected (block 416), the initiated communication is continued (block 418). Periodically, it is determined whether the network analysis used to select the coder/decoder mechanism currently in use should be updated (block 420). This can be triggered by, for example, newly available network statistics, one or more problems continuing the communication including any degradation in the communication session, and/or a periodic timer. Where a network analysis is not triggered (block 420), the communication is continued using the currently selected coder/decoder mechanism (block 418).

Alternatively, where the network analysis is triggered (block 420), the process of offering and accepting a coder/decoder mechanism is repeated (blocks 404, 406, 408, 410, 412, 414, 416, 418). In this way, a sub-optimal or otherwise undesirable coder/decoder mechanism can be replaced based on updated network condition information. In order to provide a satisfactory reaction for end users, reaction to large, negative changes in network state must be fast, on the order of 2 seconds. In order to prevent oscillating network congestion, reaction to positive changes in network state may be slow and randomized, on the order of several minutes. Further, because it is possible that the media stream associated with the communication session is the source of any perceived network congestion, it may be possible to incur a scenario where oscillation between selected coder/decoder mechanisms occurs. Further, it may be warranted to deselect some coder/decoder mechanisms that utilize more bandwidth than that available from the network.

It may be desirable where a particular coder/decoder mechanism fails that a new coder/decoder mechanism selection be implemented on the next call, and all calls bounded by a long recovery decay/threshold interval. This decay/threshold interval may be, for example, five minutes, the next call, or the next fifth call. Based on the disclosure provided herein, one of ordinary skill in the art will recognize an appropriate decay/threshold interval based on particular design considerations. Further, it may be desirable that the selection process not remove a coder/decoder mechanism from the list of those available, but instead modify the preference behavior and thus affect which of the available coder/decoder mechanisms are selected and the conditions under which they are selected. Such an approach may increase compatibility between communicating endpoints even if the quality is less than ideal. In some cases, choosing a higher bandwidth coder/decoder mechanism is done only after continuous usage. A hold timer may be used to determine when it is acceptable to choose a higher bandwidth coder/decoder mechanism.

Figure 4A:
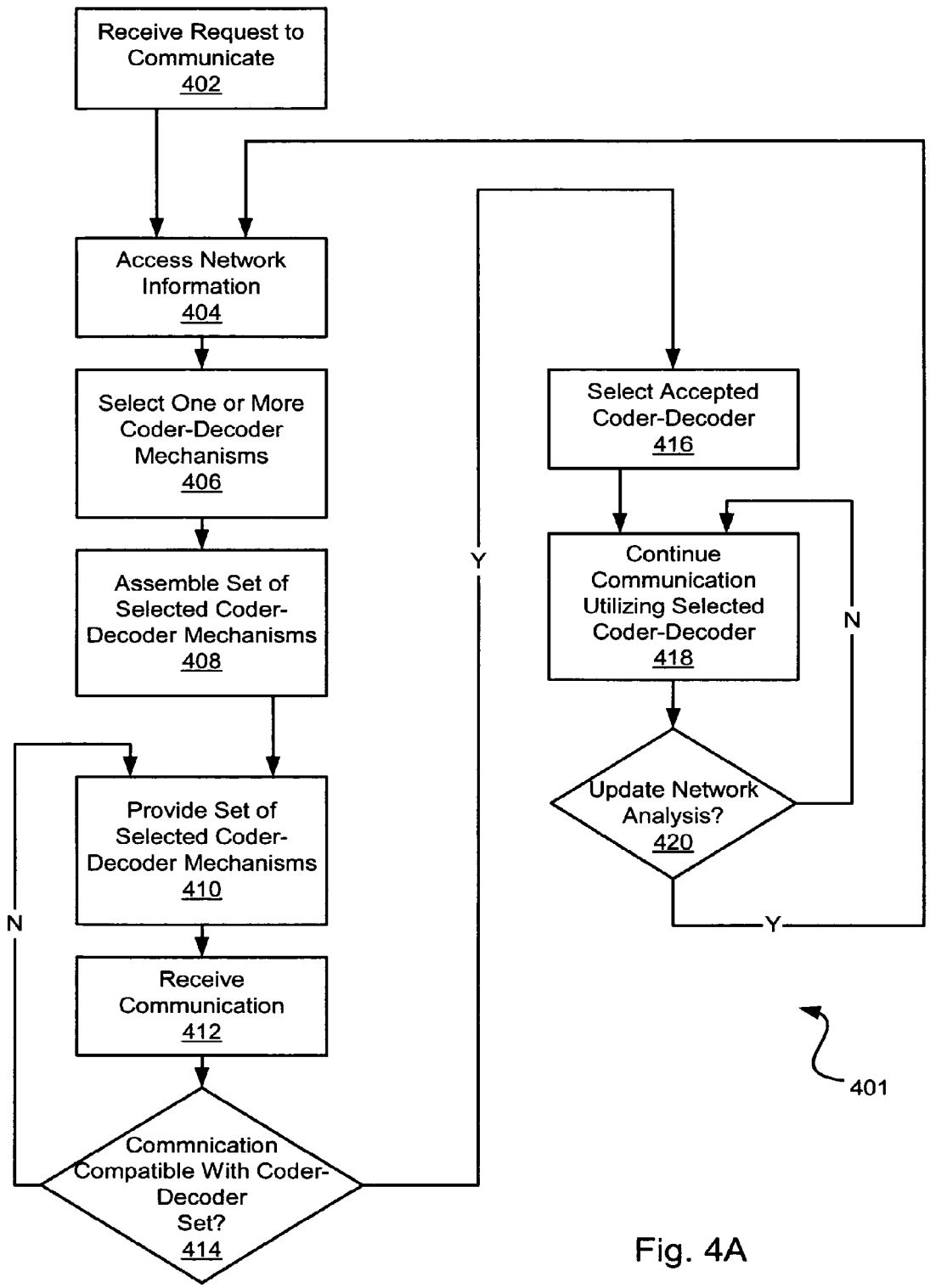
FIG. 4 are flow diagrams depicting various methods for utilizing variable coder/decoders in accordance with some embodiments of the present invention.
Figure 4B:
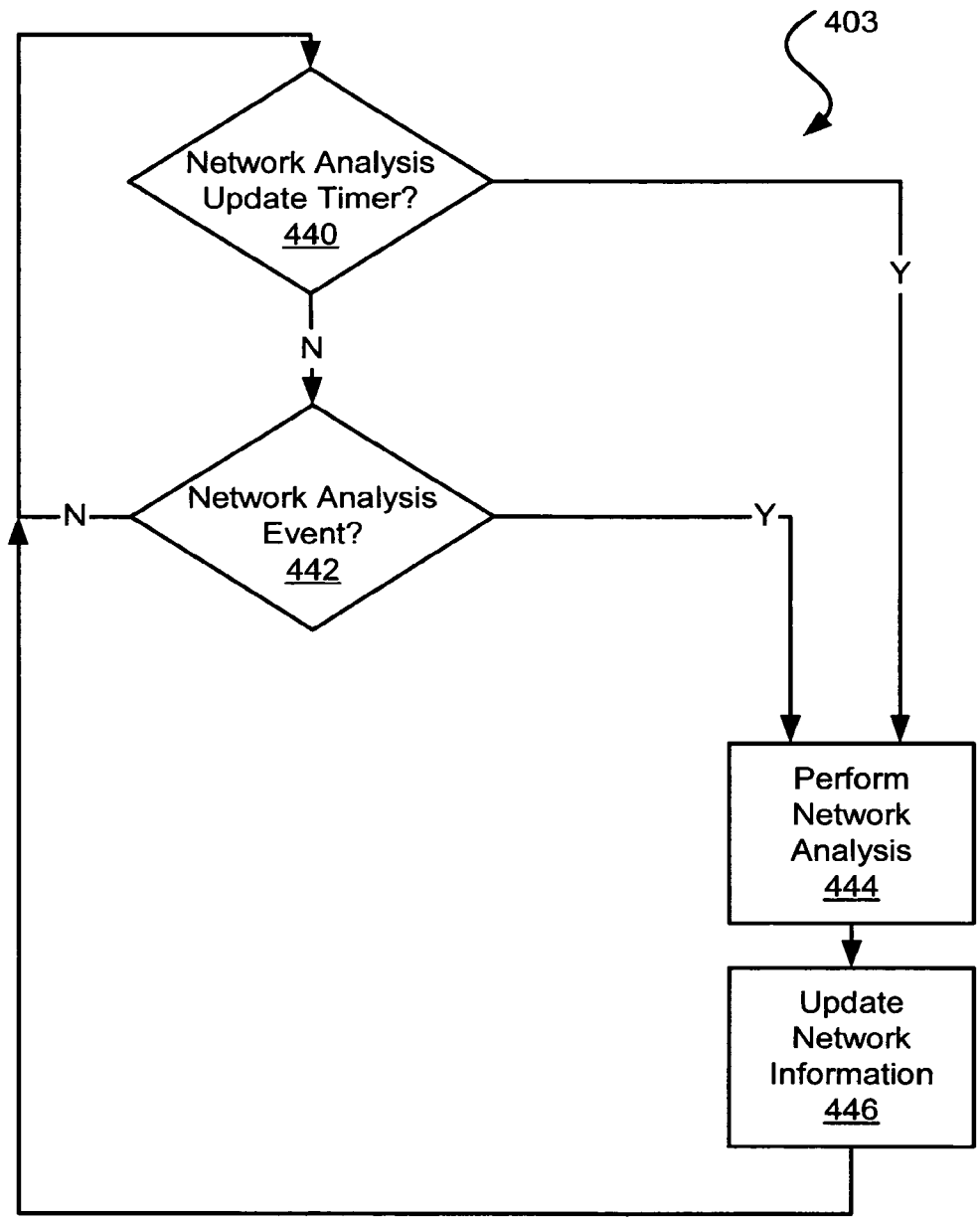

Turning to FIG. 4B, a flow diagram 403 provides a detailed view of update network analysis block 420 is presented. Following flow diagram 403, it is determined if a timer expired indicating that it is time to update a network analysis, thereby updating network statistics used to select desired coder/decoder mechanisms (block 440). Where the timer has not yet been exceeded (block 440), it is determined whether an event occurred suggesting that a new network analysis should be performed (block 442). Such an event may be, but is not limited to, an appreciable degradation in the quality of service of the ongoing communication, a third party network statistic update such as an indication of device failure or network congestion indication, and/or the like. Where either an event or timer is indicated (blocks 440, 442), a network analysis is performed (block 444). Such a network analysis can include interrogating RTCP messages, issuing pings or trace routes, and/or other methods as are known in the art to determine network characteristics. The determined network characteristics are then updated as network statistics that can be used in the selection of coder/decoder mechanism selection (block 446).

Figure 4C:
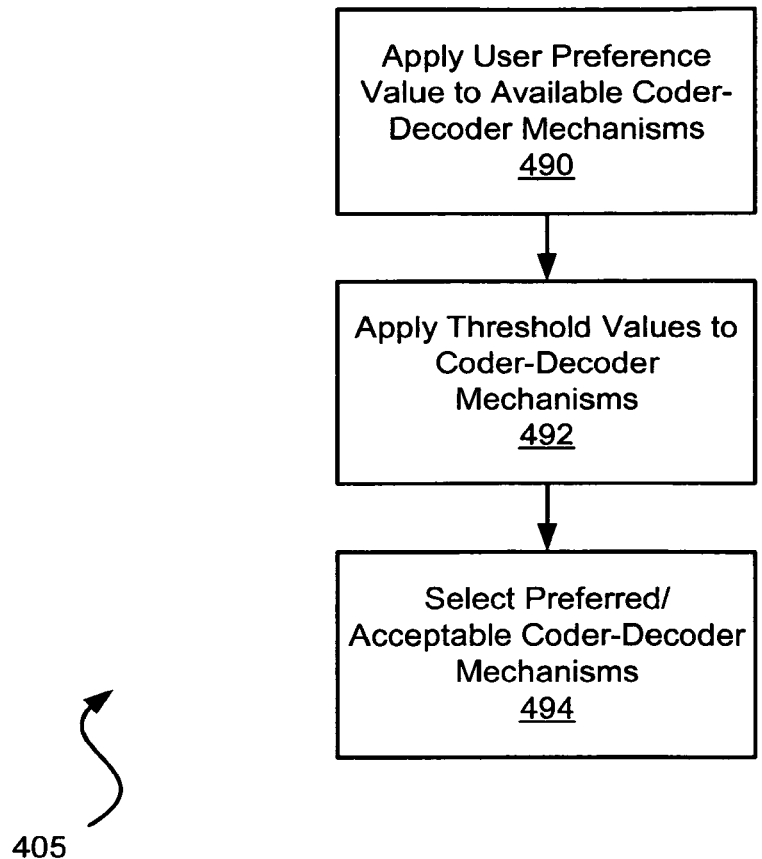

Turning to FIG. 4C, a flow diagram 405 provides a view of a process for assembling an offer in accordance with embodiments of the present invention and as previously represented by blocks 406, 408 of FIG. 4A. Following flow diagram 405, a value is applied to all available coder/decoder mechanisms (block 490). The value applied may be derived from the available network statistics or some other means. Threshold values are applied to the available coder/decoder mechanisms (block 492). Where thresholds are not met, the non-compliant coder/decoder mechanism is removed from consideration. Based on this, the most preferred (based on value) of the coder/decoder mechanisms are selected for inclusion in the offer (block 494).

Figure 4D:
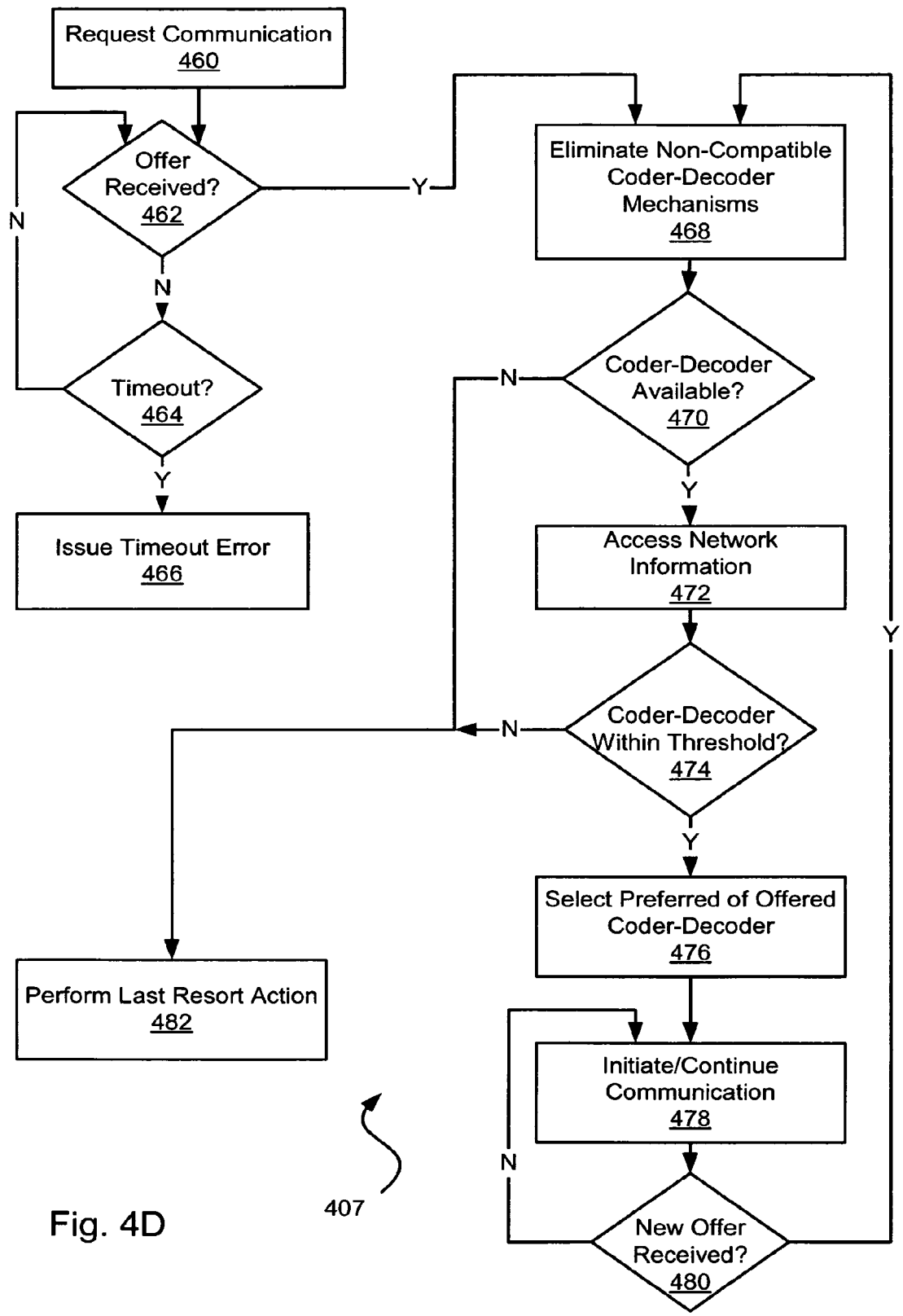

Turning to FIG. 4D, a flow diagram 407 provides a view of an offer/acceptance process from the perspective of the accepting endpoint. Following flow diagram 407, a request to communicate is received (block 460). This request typically includes an indication of one or more coder/decoder mechanisms supported by the requesting endpoint (i.e., an offer). Thus, the request is parsed to determine if it includes such an offer (block 462). Where an offer is not found, a timeout period is awaited (block 464) during which the additional request information may be received that may include an offer. Where the timeout period expires without an offer being found (block 464), a timeout error is issued (block 466).

Alternatively, where an offer is detected (block 462), it is considered to determine which of the offered coder/decoder mechanisms in the offer are acceptable and/or desirable. This process can include eliminating all coder/decoder mechanisms that are not supported by the receiving endpoint (block 468). It is then determined whether there are any remaining coder/decoder mechanisms is the offer (block 470). Where one or more coder/decoder mechanisms remain in the offer (block 470), network statistics available to the receiving endpoint are accessed and can be used to determine which of the remaining coder/decoder mechanisms to select (block 472).

It is determined if one of the remaining coder/decoder mechanisms is within acceptable communication thresholds (block 474). Where one or more of the remaining coder/decoder mechanisms is within threshold (block 474), one of the threshold meeting coder/decoder mechanisms is selected (block 476). In some cases, the selection is based on the preference provided by the offering endpoint. Thus, for example, where the offering endpoint indicated two available coder/decoder mechanisms and both are supported by the receiving endpoint and within threshold, the selected coder/decoder mechanism would be that preferred by the offering endpoint as indicated by the order of the coder/decoder mechanisms in the offer.

With the coder/decoder mechanism selected (block 476), the communication is instigated and continued in conformance with the selected (in this case, accepted) coder/decode mechanism (block 478). The communication continues until it is determined that a new offer has been received (block 480). Where a new offer is received (block 480), the acceptance process is repeated (blocks 468, 470, 472, 474, 476) and the communication is continued (block 478). Where, on the other hand, a the offer does not indicate a coder/decoder mechanism supported by the receiving endpoint (block 470) or none of the available coder/decoder mechanisms are within threshold (block 474), a last resort action may be performed (block 482). This may include, for example, communicating using a universally supported, albeit non-optimal coder/decoder mechanism.

The coder/decoder mechanism selection may be done such that all available coder/decoder mechanisms that are under an Nr thresholds by a configurable percentage are preferred. In one particular case, the configurable percentage is set at a default value of ten percent. From the offered coder/decoder mechanisms, the coder/decoder mechanism may be the one that is closest to the Ns threshold, minus a configurable percentage. Again, in some cases, this configurable percentage can be set at a default of ten percent. Data points that may be considered in selecting an appropriate coder/decoder mechanism include, but are not limited to:

Nrd=Measured network performance receive delay threshold

Nrj=Measured network performance receive jitter threshold

Nrl=Measured network performance receive packet loss threshold

Nrb=Estimated network maximum receive bandwidth

Nsd=Measured network performance send delay threshold

Nsj=Measured network performance send jitter threshold

Nsl=Measured network performance send packet loss threshold

Nsb=Estimated network performance send bandwidth threshold

Cxd=CODEC 'x' performance threshold delay

Cxj=CODEC 'x' performance threshold jitter

Cxl=CODEC 'x' performance threshold packet loss

Cxb=CODEC 'x' performance threshold bandwidth

Cxq=CODEC 'x' quality rating (such as, for example, a Mean Opinion Score ("MOS") number for voice device)

In one particular embodiment of the present invention, the set of coder/decoder mechanisms 360 includes the following exemplary set of four coder/decoder mechanisms with associated datapoints as set forth in Table 1. The Bandwidth is the presumed amount of bandwidth available from the network and that needed by a particular coder/decoder mechanism. The Delay is the presumed amount of delay incurred in traversing the network, and for a coder/decoder it is the latency incurred performing encoding or decoding. The loss is the amount of packet loss that can be sustained by a coder/decoder and still achieve acceptable results, and for the network it is the amount of loss being experienced when using the network. The Jitter for the network is the amount being experienced through the network, and for a coder/decoder it is the amount of jitter that the coder/decoder can accept and still operate effectively. The Quality is a perceived quality for the coder/decoder mechanism and has no meaning for the network, and the Preference Rating is an indication of whether the coder/decoder mechanism will work under the current network conditions with anything less than 4.00 being less than fully functional. The Preference Rating is assumed to be 4.00 upon initialization.

TABLE 1

Exemplary Coder/Decoder Mechanisms

| | Bandwidth | Delay | Loss | Jitter | Quality | Pref. Rating |
|---|---|---|---|---|---|---|
| Current Est. Network | Init. | Init. | Init. | Init. | n/a | n/a |
| Cod/Dec A | 64 | 20 | 0.1% | 30 | 3.7 | 4.00 |
| Cod/Dec B | 120 | 10 | 0.1% | 30 | 4.1 | 4.00 |
| Cod/Dec C | 64 | 30 | 2.5% | 30 | 3.5 | 4.00 |
| Cod/Dec D | 16 | 50 | 0.2% | 50 | 3.4 | 4.00 |

In accordance with the particular embodiment, forming an ordered coder/decoder mechanism list using the four coder/decoder mechanisms set forth in Table 1 proceeds as follows. At initialization, the estimated network performance values of Bandwidth, Loss and Jitter are set to the values offered by the highest quality coder/decoder mechanism from the set of coder/decoder mechanisms 360. Next, Delay is set to a presumed acceptable value for delay (e.g., 300 milliseconds) less a presumed network traversal delay (e.g., 150 milliseconds). This is set to assure that the amount of network traversal delay plus coder/decoder mechanism delay is less than a total amount of delay that would be acceptable in performing a particular transfer.

Alternatively, a network diagnostic may be performed to obtain values for network performance upon initialization. In some cases, the aforementioned steps are performed using only data points associated with the receive side (e.g., Nrd, Nrj, Nrl and Nrb), while in other cases both the receive and send side are considered (e.g., Nrd, Nrj, Nrl, Nrb, Nsd, Nsj, Nsl and Nsb). While it may prove advantageous to utilize both send and receive data points, using only receive datapoints provides an effective approach for preferring one coder/decoder mechanism over another. The setting of the current estimated network statistics to those of the highest quality coder/decoder mechanism is represented in Table 2 below.

TABLE 2

Set Current Estimated Network Statistics to Those of Highest Quality Coder/decoder mechanism

| | Bandwidth | Delay | Loss | Jitter | Quality | Pref. Rating |
|---|---|---|---|---|---|---|
| Current Est. Network | 120 | 70 | 0.1% | 30 | n/a | n/a |
| Cod/Dec A | 64 | 20 | 0.1% | 30 | 3.7 | 4.00 |
| Cod/Dec B | 120 | 10 | 0.1% | 30 | 4.1 | 4.00 |
| Cod/Dec C | 64 | 30 | 2.5% | 30 | 3.5 | 4.00 |
| Cod/Dec D | 16 | 50 | 0.2% | 50 | 3.4 | 4.00 |

Continuing with the formation of the ordered coder/decoder mechanism list in accordance with the particular embodiment, the performance value for each coder/decoder mechanism is compared to the current estimated network performance in both send and receive directions (where both send and receive are being considered, otherwise the comparison is only in one of the receive or send direction). For each performance value where the coder/decoder mechanism threshold compares favorably to the estimated network performance, set a value of "1". Otherwise, set the value to "0". Next, the set values are summed to create the Preference Rating. A favorable comparison for Bandwidth is finding that the coder/decoder mechanism requires less than or equal bandwidth; for Delay it is favorable where the coder/decoder mechanism inserts less than or equal latency; for Loss it is favorable to accept greater than or equal packet loss; and for Jitter it is favorable to accept greater than or equal jitter. The Ranking is obtained by ordering the Preference Ratings for the coder/decoder mechanisms, with any ties between rankings broken by comparing the Cxq quality rating for the tied coder/decoder mechanisms. Table 3 below is similar to Tables 1 and 2 above, except that it includes an additional column showing the identified rankings.

TABLE 3

Assigned Rankings of Exemplary Coder/decoder mechanisms

| | Bandwidth | Delay | Loss | Jitter | Quality | Pref. Rating | Ranking |
|---|---|---|---|---|---|---|---|
| Current Est. Network | 120 | 70 | 0.1% | 30 | n/a | n/a | |
| Cod/Dec A | 64 | 20 | 0.1% | 30 | 3.7 | 4.00 | 2 |
| Cod/Dec B | 120 | 10 | 0.1% | 30 | 4.1 | 4.00 | 1 |
| Cod/Dec C | 64 | 30 | 2.5% | 30 | 3.5 | 4.00 | 3 |
| Cod/Dec D | 16 | 50 | 0.2% | 50 | 3.4 | 4.00 | 4 |

As the endpoint is operated, the current estimated network characteristics are updated. These updates affect the ranking as the same algorithm is applied using the current estimated network characteristics for comparison reasons. Thus, for example, it may be found that the network is producing a loss of 0.2% when coder/decoder mechanism B is operated. This level of packet loss is too high for the chosen coder/decoder mechanism (i.e., greater than 0.1% for coder/decoder B), and will thus encourage a change of coder/decoder mechanism by updating the preference list. In such a case, coder/decoder C will become the preferred mechanism. In addition, the Bandwidth number for the current estimated network conditions can be adjusted to reflect the actual bandwidth loss. Thus, in this case, the Bandwidth is reduced by 0.2%. In making this change to the Bandwidth, any coder/decoder mechanisms that require more than this bandwidth are demoted (i.e., have there ranking value decreased substantially). Table 4 illustrates the aforementioned change in preference.

TABLE 4

Updated Preference List to Reflect Identified Network Conditions

| | Bandwidth | Delay | Loss | Jitter | Quality | Pref. Rating | Ranking |
|---|---|---|---|---|---|---|---|
| Current Est. Network | 119.76 | 70 | 0.2% | 30 | n/a | n/a | |
| Cod/Dec A | 64 | 20 | 0.1% | 30 | 3.7 | 3.00 | 3 |
| Cod/Dec B | 120 | 10 | 0.1% | 30 | 4.1 | 3.00 (excessive bandwidth) | 4 |
| Cod/Dec C | 64 | 30 | 2.5% | 30 | 3.5 | 4.00 | 1 |
| Cod/Dec D | 16 | 50 | 0.2% | 50 | 3.4 | 4.00 | 2 |

In some cases, the Delay and Loss characteristics may be updated using the following methods. Many coder/decoder mechanisms have deterministic packet rates that allow the each end of a media stream to predict packet loss. For example, the use of G.711 with twenty millisecond spacing is negotiated at the beginning of a media session. The G.711 media stream with twenty millisecond packet spacing sends one packet every twenty milliseconds. Thus, over the course of one second, fifty packets (with a small tolerance allowed for timing and jitter) should be received. If any packets are missing, some packet loss has occurred. This loss can be calculated and used as part of the coder/decoder mechanism preference configuration process. Latency or delay characteristics can often be detected by use of a IP ping or SIP OPTIONS request between communicating endpoints. In the case that IP ping or SIP OPTIONS cannot be used, RTCP may be implemented and used to detect end-to-end latency between the media endpoints through the use of timestamps in the RTCP packets.

Figure 5A:
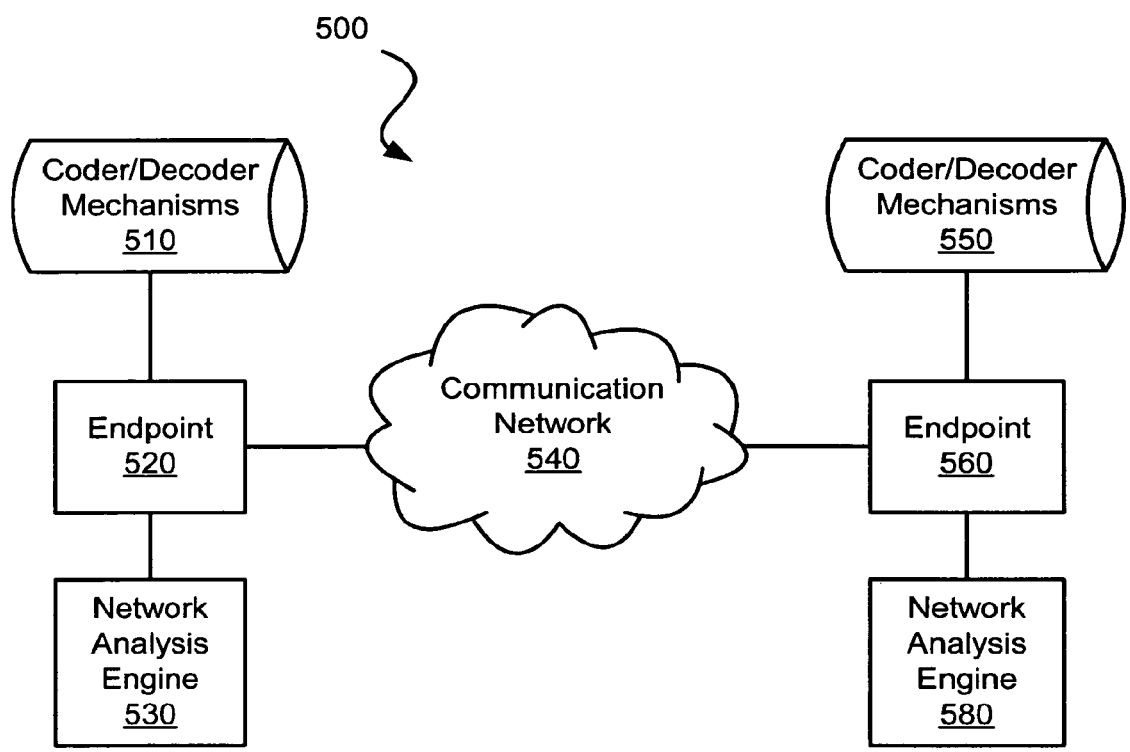
FIG. 5 depict variable coder/decoder systems in accordance with various embodiments of the present invention.

Turning to FIG. 5, two variable coder/decoder systems 500, 501 in accordance with various embodiments of the present invention are illustrated. System 500 of FIG. 5A includes two endpoints 520, 560 communicably coupled via a communication network 540. Each of endpoints 520, 560 are communicably coupled to respective coder/decoder mechanisms 510, 550. In one particular case, these coder/decoder mechanisms 510, 550 are computer readable mediums including instructions executable by respective endpoints 520, 560 to implement a variety of coder/decoder mechanisms, and/or to select between the available coder/decoder mechanisms. In addition, network analysis engines 530, 580 are coupled to respective endpoints 520, 560. Network analysis engines 530, 580 are capable of providing network analysis and/or statistics that can be used to select between the available coder/decoder mechanisms.

Figure 5B:
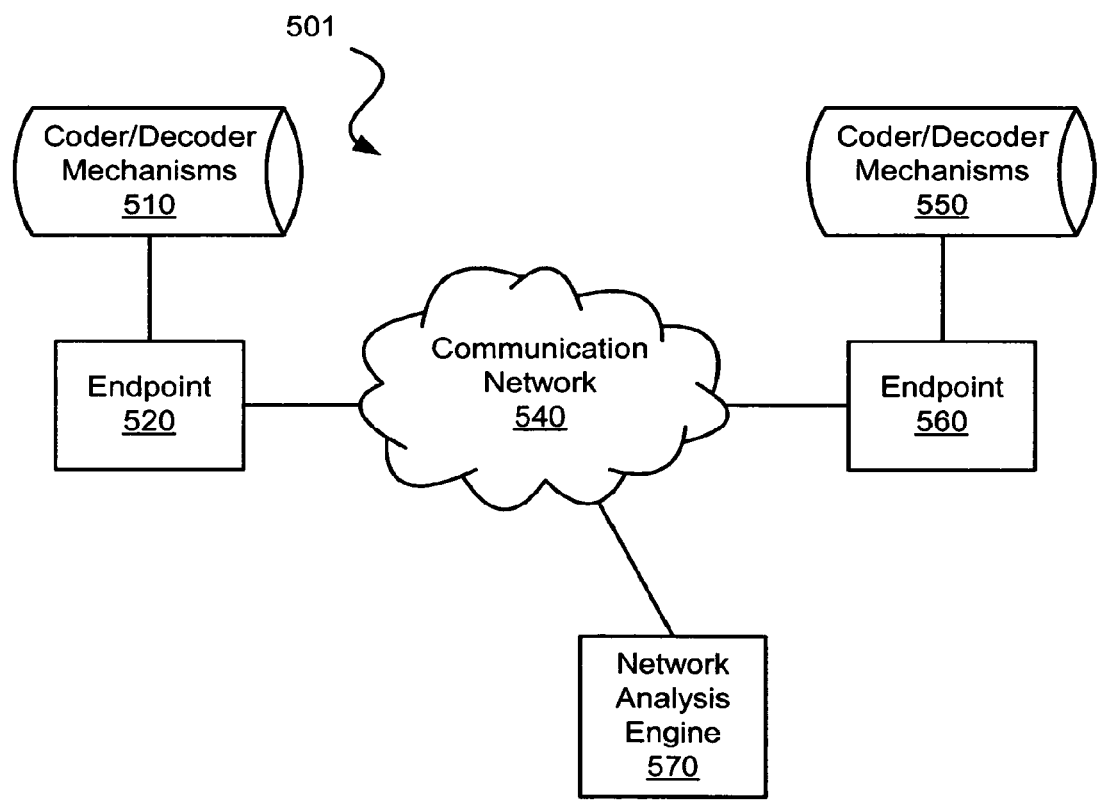

Turning to FIG. 5B, a system 501 that is similar to system 500 is illustrated. System 501 includes a network analysis engine 501 capable of supplying network analysis and/or statistic information to endpoints 520, 560. Thus, in system 501, selection of coder/decoder mechanisms to offer and which of the offered coder/decoder engines is done based on network statistics received from a common source. Although, in some cases, the statistics provided from the common source may be indicative of the network from the perspective of the particular endpoint 520, 560 receiving the network statistics. In some cases, these network statistics may be used exclusively, or in combination with network statistics derived by a network analysis engine associated directly with a particular endpoint.

Figure 6A:
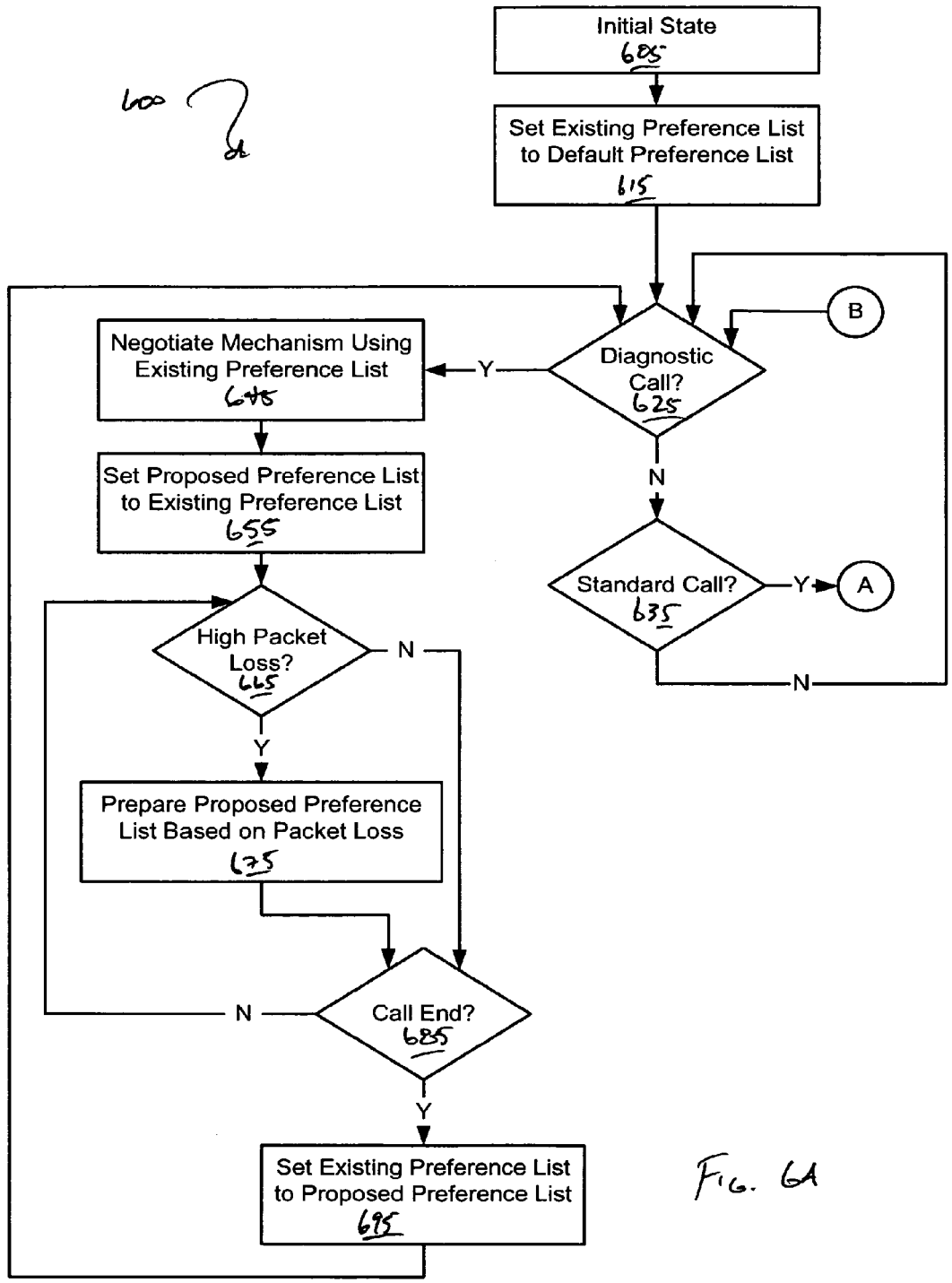
FIG. 6 are flow diagrams depicting another method in accordance with embodiments of the present invention including mid-call preference updating, post-call preference updating, and diagnostic call preference updating.
Figure 6B:
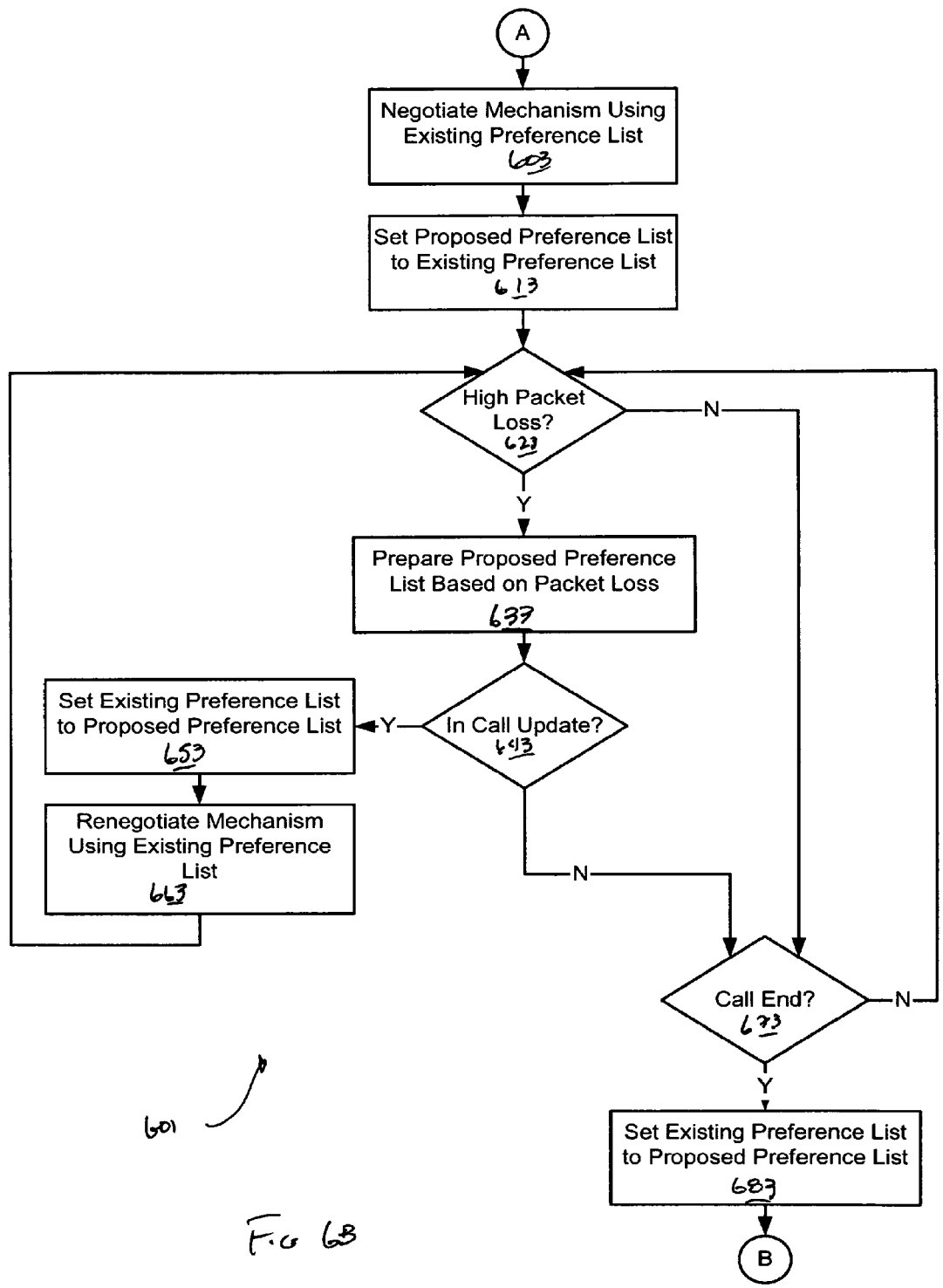

Turning to FIG. 6, flow diagrams 600, 601 depict another method in accordance with embodiments of the present invention including mid-call preference updating, post-call preference updating, and diagnostic call preference updating. Based on the disclosure provided herein, one of ordinary skill in the art will recognize a variety of embodiments possible that include one or more of mid-call preference updating, post-call preference updating, and diagnostic call preference updating. Following flow diagram 600, an initial state of an endpoint is established (block 605). Such an initial state may be, for example a power on state or a reset state. Upon establishing the initial state, an existing preference list (i.e., the list of coder/decoder mechanisms that will be used for negotiation) is updated to reflect a default state (block 615). This default state may be a pre-configured list of coder/decoder mechanisms that is ordered according to an equilibrium function of network performance requirements and audio quality, however, one of ordinary skill in the art may recognize other default approaches that may be used depending upon whether the application is for voice transfer or other data transfer. In some case, the highest performing coder/decoder available will receive the highest list ranking, followed in descending order by lesser rankings.

In addition, it is determined whether a diagnostic call is being received (block 625), or whether a standard call is being sent or received (block 635). A diagnostic call is identified as a call that either originates from a diagnostic tester or is sent to a diagnostic tester. This can be done by, for example, maintaining a register programmed with access number(s) for known diagnostic tester(s), and comparing the origination or destination number of an initiating call with the number(s) from the register. Where a match is found, the call is determined to be a diagnostic call. Otherwise, a call is determined to be a standard call. A diagnostic call may be used, for example, to reset the existing preference list. The diagnostic service may be a quality reference service, delivering the best possible quality to the end point. This service may be performed automatically or manually to reset the existing preference list, and such a service may provide a useful method for promoting higher performance coder/decoder mechanisms in the existing preference list. This process may be instigated periodically by either or both of the end point and a diagnostic tester.

Where the call is a diagnostic call (block 625), a negotiation is enjoined between the endpoint and the diagnostic tester to determine which coder/decoder mechanism will be used as described above (block 645). A proposed preference list is set to be equal to the existing preference list (block 655), and as the test call proceeds it is determined whether there is an unacceptable level of packet loss (block 665). Where an unacceptably high packet loss is found (block 665), an updated list of preferred coder/decoder mechanisms is prepared and maintained as the proposed preference list (block 675). This updated list reflects identified network conditions and may be prepared in one of the manners previously described. Once it is determined that the call has ended (block 685), the existing preference list is updated to be the proposed preference list (block 695). This existing preference list will be that used in the negotiation of the next call either outgoing or incoming.

Alternatively, where a call is a standard call (block 635), the process proceeds as set forth in flow diagram 601. Following flow diagram 601, a negotiation is enjoined between the endpoint and the calling party endpoint in the event the call is an incoming call, or the called party endpoint in the event the call is an outgoing call (block 603). Again, as previously described, the outcome of the negotiation determines the coder/decoder mechanism to be used in the call. The proposed preference list is set to be equal to the existing preference list (block 613), and as the call proceeds it is determined whether there is an unacceptable level of packet loss (block 623). Where an unacceptably high packet loss is found (block 665), an updated list of preferred coder/decoder mechanisms is prepared and maintained as the proposed preference list (block 675). This updated list reflects identified network conditions and may be prepared in one of the manners previously described.

Where it is determined that mid-call modification of coder/decoder mechanism is available (block 643), the existing preference list is set equal to the previously prepared proposed preference list (block 653). The coder/decoder selection negotiation is again joined using the recently updated existing preference list, and resulting in a selection of a new coder/decoder mechanism to use in finishing the call (block 663). At this point the call continues with the newly selected coder/decoder mechanism with continued consideration of unacceptably high packet losses (block 623). In some instances of the embodiment, mid-call modification is allowed for selecting a coder/decoder mechanism of higher quality, while not being allowed for selecting a coder/decoder mechanism of lower quality. Alternatively, in other instances of the embodiment, mid-call modification is allowed for selecting a coder/decoder mechanism of lower quality, while not being allowed for selecting a coder/decoder mechanism of higher quality. As yet another alternative, mid-call modification may be allowed for either selecting higher or lower quality coder/decoder mechanisms, or may not be allowed at all.

Alternatively, where it is determined that mid-call modification of coder/decoder mechanism is not available (block 643), the end of the call is awaited (block 673). After the call ends (block 673), the existing preference list is set equal to the previously prepared proposed preference list (block 683). This newly updated existing preference list will be used in the negotiation of a coder/decoder mechanism in relation to the next call.

Various systems, methods and devices in accordance with the present invention may include network layer diagnostic capabilities. These are features related to testing and reporting network state as seen by the subscriber device. Numerous network related conditions can be detected by the subscriber device. The device can report these conditions and in some cases respond with an action. The systems, methods and device in accordance with the present invention may further include network quality diagnostics. Quality detection can perform, among other things, an RTP test to a well known host (e.g., a list of DNS names specified in the configuration file) on the voice provider network to test and verify network performance. Criteria for performance evaluation can include, but is not limited to latency, packet loss and jitter. In some cases, RTCP can also be used as part of the solution for this function. Feedback from this test could also be used to select the default coder/decoder mechanism for the subscriber. In addition, the quality test could be integrated with voice provider selection capability to help select the best provider for the subscriber. The quality test may be performed at a configurable interval, such as at system startup time and/or once a week, once a day and/or on demand from the subscriber. Further, the results of the quality diagnostic may be available as an event diagnostic log and reset of network performance data for dynamic coder/decoder mechanism selection. In providing a Quality of Service (QoS) Diagnostic, the device may be capable of sending diagnostic media streams in both directions using, for example, an RTP stream for a specified duration with and without user intervention.

In conclusion, the present invention provides novel systems, devices, methods and arrangements for facilitating communications using coder/decoder mechanisms. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A coder/decoder system, the system comprising:
    an instruction execution unit;
    a computer readable medium encoded with computer executable instructions, wherein the computer readable medium encodes:
    at least one network statistic; and
    instructions executable by the instruction execution unit, wherein the instructions are executable to:
        implement a plurality of coders/decoders;
        provide an offer of at least two of the plurality of coders/decoders, wherein the at least two of the plurality of coders/decoders are chosen-based at least in part on the at least one network statistic; and
        subsequent to the provision of said offer, receive an acceptance of the offer, wherein the acceptance of the offer identifies a selected one of the offered coders/decoders, the instructions further operable to:
            determine failure of the selected coder/decoder;
            based on the determined failure of the selected coder/decoder, modify the offer; and
            provide the modified offer.

2. The coder/decoder system of claim 1, wherein the instructions executable by the instruction execution unit are further executable to:
    analyze a network; and
    based at least in part on the network analysis, update the at least one network statistic.

3. The system of claim 2, wherein the analyzing network functionality is done from the perspective of an end point.

4. The system of claim 1, wherein each of the offered coders/decoders are associated with a characteristic definition.

5. The system of claim 1, wherein the modified offer comprises a plurality of coders/decoders.

6. A coder/decoder device, the device comprising:
a plurality of coder/decoder mechanisms;
a computer readable medium encoded with computer executable instructions and at least one network statistic; and
a coder/decoder selection engine, wherein the coder/decoder selection engine is operable to select at least two of the plurality of coder/decoder mechanisms based at least in part on the at least one network statistic, and wherein the coder/decoder selection engine is operable to provide an offer comprising the selected coder/decoder mechanisms, and wherein subsequent to providing the offer, the coder/decoder selection engine is operable to receive acceptance of the offer that identifies a chosen one of the selected coder/decoder mechanisms, and wherein responsive to the acceptance of the offer, the coder/decoder selection engine is further operable to:
determine failure of the chosen coder/decoder mechanism;
based on the determined failure of the chosen coder/decoder, modify the offer; and
provide the modified offer.

7. The coder/decoder device of claim 6, wherein the device further comprises:
a network analysis engine, wherein the network analysis engine is operable to analyze a network and to provide the at least one network statistic.

8. The coder/decoder device of claim 6, wherein the network analysis engine is operable to analyze the network from the perspective of a first end point, and wherein the offer is provided to a second end point.

\* \* \* \* \*